Dec. 6, 1966  N. W. JOHNSON ET AL  3,289,953
LUBRICATED SHAFT AND SHAFT SEAL
Filed April 20, 1964
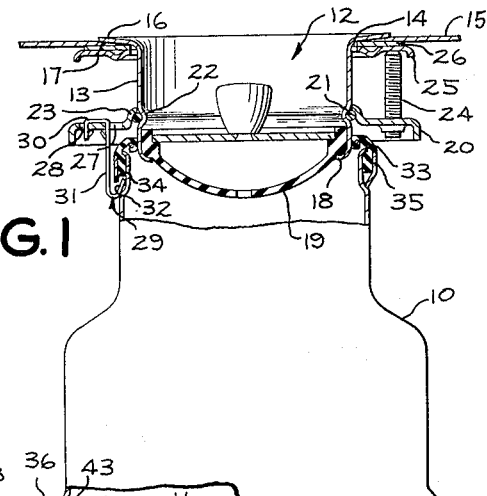
FIG. 1
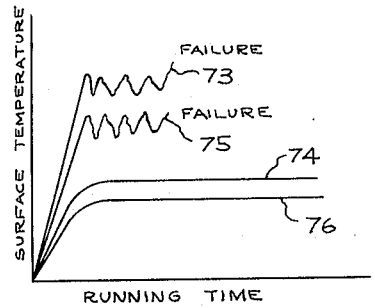
FIG. 4
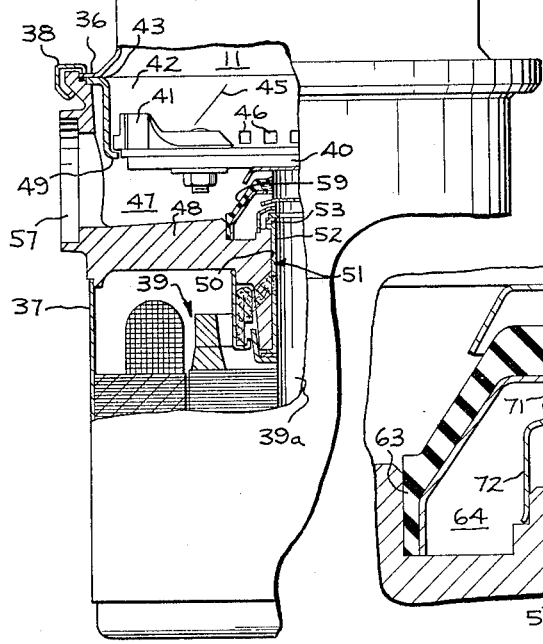
FIG. 3
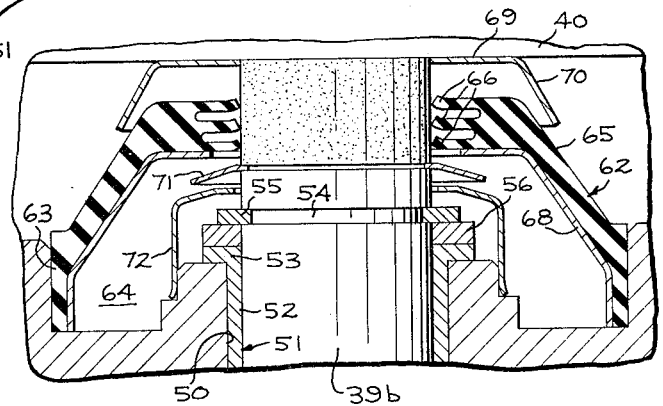
FIG. 2
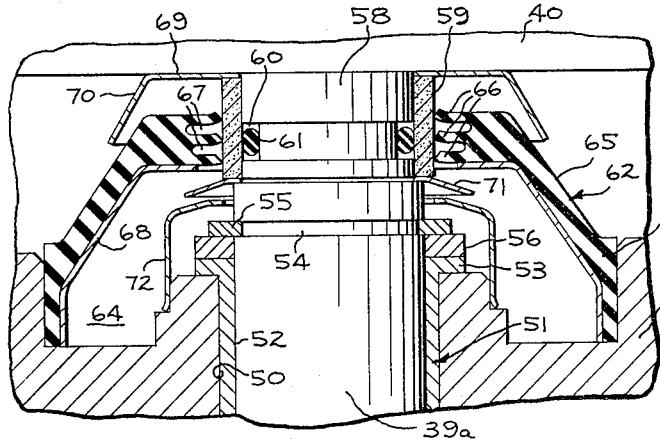
INVENTORS
NORMAN W. JOHNSON
& ROBERT P. FARRELL JR.
BY James E. Espe
THEIR ATTORNEY United States Patent Office 3,289,953
Patented Dec. 6, 1966

3,289,953
LUBRICATED SHAFT AND SHAFT SEAL
Norman W. Johnson and Robert P. Farrell, Jr., Louisville, Ky., assignors to General Electric Company, a corporation of New York
Filed Apr. 20, 1964, Ser. No. 361,143
8 Claims. (Cl. 241—257)

This invention relates generally to a lubricated shaft and shaft seal arrangement and, more particularly, to an improved lubricated shaft and shaft seal for use in a food waste disposer.

The usual construction of food waste disposers includes a drive shaft, which connects the motor to the comminuting means for driving the comminuting means. This shaft extends through the drain chamber which also functions to exhaust comminuted material and water from the disposer. Therefore it is necessary to provide a sealing arrangement for the drive shaft in order to prevent any of the comminuted material or water from reaching the motor structure where it would cause damage. Such sealing arrangements involve a sealing engagement between a stationary resilient member and a rotating member. The friction between these two relatively moving members can cause the temperature of the resilient member to rise to such a level that the resilient member fails and water and/or comminuted material leak into the motor structure.

Accordingly, it is an object of the present invention to provide an improved lubricated shaft and shaft seal for use in a food waste disposer.

It is another object of this invention to provide such a shaft and shaft seal which operates at an optimum temperature level.

It is a further object of this invention to provide a shaft and shaft seal for use in a food waste disposer which is automatically lubricated to prevent seal failure.

It is a further object of this invention to provide a shaft and shaft seal for use in a food waste disposer which is substantially less exepnsive to manufacture than known heretofore.

Briefly stated, in accordance which one aspect of the present invention, a shaft seal of a resilient material is mounted within the housing of a food waste disposer and engages the shaft of the disposer with a sealing contact. The portion of the drive shaft engaged by the resilient member is formed of a sintered metal impregnated with a temperature sensitive lubricant which flows to lubricate the seal when the operating temperature has reached a predetermined level.

While the specification concludes with claims particularly pointing out and distinctly claiming the subject matter which is regarded as the invention, it is believed that the invention will be better understood from the following description taken in connection with the accompanying drawings in which:

FIGURE 1 is a elevational view of a food waste disposer, partly broken away and partly in section to illustrate details;

FIGURE 2 is a partial sectional view of the food waste disposer of FIGURE 1 illustrating the details of the shaft and shaft seal arrangement;

FIGURE 3 is a partial sectional view similar to FIGURE 2 illustrating another embodiment of the invention;

FIGURE 4 is a graphic representation of the performance characteristics of the shaft and shaft seal arrangement of the invention.

Referring now to the drawing, and particularly to FIGURES 1 and 2, there is shown a food waste disposer having a generally cylindrical hopper or housing 10 enclosing a comminuting chamber 11 near the bottom of which the comminuting or shredding of waste material takes place. The upper end of the housing 10 includes an opening 12 through which the waste material and water is supplied to the housing 10. The opening 12 is formed by a cylindrical tubular sleeve 13 which is arranged to be inserted down through a drain opening 14 in the bottom wall 15 of a sink, the sleeve 13 being provided with an annular flange 16 adapted to overlap an annular marginal edge 17 of the drain opening 14. The lower end of sleeve 13 is provided with an inturned flange 18 which is adapted to support a splash guard 19.

The sleeve 13 also constitutes a support means for the housing 10, for which purpose the sleeve 13 is rigidly secured to the bottom wall 15 of the sink. This is accomplished by a support ring 20 which encircles the sleeve 13 and cooperates with a snap ring 21. The snap ring 21 is positioned in an annular recess 22. The inner peripheral portion 23 of support ring 20 is shaped to seat upon the snap ring 21. Thus, as the support ring 20 tends to move downwardly, it engages snap ring 21 and prevents snap ring 21 from expanding at the same time, snap ring 21 prevents downward movement of support ring 20. Support ring 20 is provided with a plurality of spaced threaded openings, each of which receives a bolt 24. The bolts 24 function to clamp flange 16 to the marginal edge 17 of the sink by means of clamping ring 25 which encircles the sleeve 13. When the bolts 24 are screwed upwardly they sandwich the marginal edge 17 between the flange 16 and the clamping ring 25. Preferably a ring gasket 26 is inserted between the marginal edge 17 and the clamping ring 25 to insure a liquid tight seal.

In addition to rigidly securing the sleeve 13 to the sink, the support ring 20 also serves to attach the housing 10 to the sleeve 13. To accomplish this the support ring 20 is provided with a plurality of slot patterns, each including an inner slot 27 and an outer slot 28. Each of the slot patterns receives a generally S-shaped clip 29. Each of the clips 29 includes a bent-over upper portion 30 received in a corresponding slot pattern. Each of the clips 29 also includes a resilient central portion 31 terminating with an upwardly turned free end 32.

Surrounding the upper portion of housing 10 is a gasket 33 which is provided with a surface 34 which rests upon the free ends 32 of the clips 29 when the disposer is in its normal installed position (as shown in FIGURE 1). The gasket 33 engages the outer surface of the sleeve 13 to provide a liquid tight seal between the housing 10 and the sleeve 13. In order to provide an effective seal and to minimize transfer of vibration from the housing 10 to the bottom wall 15 of the sink, the gasket 33 is preferably constructed from a resilient material. A clamping band 35 encircles the lower portion of gasket 33 and is preferably of a length sufficient to extend below the surface 34 of the gasket 33. Thus band 35 prevents the free ends 32 of the clips 29 from moving out of engagement with surface 34 when the disposer is in its installed position as shown in FIGURE 1.

The lower portion of housing 10 is provided with a flange 36 for securing a motor housing 37 to the upper housing 10. The upper end of motor housing 37 is connected to the flange 36 by means of a retaining ring 38. Mounted within motor housing 37 is an electric motor 39 provided with a vertically extending shaft 39a to which is fixedly secured a rotatable comminuting means located in the bottom of chamber 11. The rotatable comminuting means comprises a flat, generally circular flywheel 40 which carries at least one impeller 41. Secured to the bottom of housing 10 so as to cooperate with the flywheel 40 and impeller 41 is a generally cylindrical wall member or shredding ring 42. A flange 43, at the top of shredding ring 42, is secured between flange 36 and motor housing 37 to hold the shredding ring stationary with respect to the housing 10. Shredding ring 42 is provided with a plurality of shredding projections 45 on its inner surface and a plurality of openings 46 adjacent to the periphery of flywheel 40 through which comminuted material is expelled into a drain chamber 47. The drain chamber is formed within housing 37 by an inner wall 48 which extends across housing 37 above motor 39. Shredding ring 42 also includes an annular, inwardly inclined shelf 49 around the lower edge thereof.

A central opening 50 is provided in the inner wall 48 for receiving the shaft 39a. The shaft 39a is supported in a combination radial and thrust bearing 51. Bearing 51 includes a tubular portion 52 extending between inner wall 48 and shaft 39a (serving as the radial bearing) and a flange 53 extending outwardly along the upper surface of wall 48 (serving as the thrust bearing). The shaft 39a is provided with an annular recess 54 in which is mounted a thrust-transferring retaining ring 55 which transfers thrust forces to flange 53 through a thrust washer 56 mounted around the shaft 39a between the flange 53 and the retaining ring 55.

From the foregoing it will be evident that, during the operation of the disposer, waste material deposited in the comminuting chamber 11 will be rotated by flywheel 40 and impelled against the shredding projections 45, by impellers 41, and that particles of comminuted material will be expelled through openings 46 into drainage chamber 47 below flywheel 40 and will finally be carried by the flow of water through the device out through drain outlet 57. Thus, during operation, drain chamber 47 will be partially filled with a body of water and comminuted waste material.

In order to prevent water and comminuted material from damaging the motor a rotary seal is provided. Referring to FIGURE 2 it will be seen that the upper end of shaft 39a is provided with a reduced diameter portion 58 about which is closely mounted a sleeve 59 for rotation with the shaft. Within the sleeve the shaft is provided with an annular recess 60 in which is mounted an O-ring 61.

A stationary resilient member 62 is mounted around shaft 39a. The resilient member 62 includes an annular base portion 63 which is received in an annular recess 64 formed in inner wall 48. A body portion 65 extends upwardly and inwardly to engage sleeve 59 with a sealing contact or fit. In order to provide the sealing fit between resilient member 62 and sleeve 59 the inner end of body portion 65 is formed with a number of axially spaced ribs 66, contacting sleeve 59 and forming pockets 67 therebetween. As the shaft 39a and sleeve 59 rotate to drive the flywheel 40, the ribs 66 seal against the outer surface of sleeve 59 and thereby prevent material from flowing into recess 64. In order to provide structural strength to resilient member 62 a supporting member 68, shaped to conform to the inner surface of resilient member 62 is provided within recess 64 inside of resilient member 62 and extends upwardly and inwardly with the resilient member. Resilient member 62 and supporting member 68 may be permanently bonded together. The supporting member 68 is spaced from sleeve 59.

As sleeve 59 rotates within ribs 66 the friction between the sleeve and ribs causes the temperature of these members to rise, and, if not controlled, will result in the ribs failing or losing their sealing effect. In order to control the rise in temperature and insure that the sealing arrangement operates at an optimum temperature, sleeve 59 is constructed of a sintered metal material impregnated with a temperature-sensitive lubricant. Thus, when the temperature rises to a predetermined level the lubricant within the sleeve flows and lubricates the areas of contact between the ribs 66 and the sleeve 59. This reduces the friction between the ribs and the sleeve and results in the ribs operating at substantially the predetermined optimum temperature.

One lubricant which has been found to be suitable in practice is a thixotropic waxy lubricant commercially available under the tradename, Gulf Plastic Petroleum E, as manufactured by Gulf Oil Corporation. This lubricant has a melting point of approximately 159° F.

In order to prevent any water or comminuted material from falling from flywheel 40 directly onto the ribs 66 a deflection member 69 is mounted against the lower surfaces of the flywheel 40 around the upper end of shaft 39a and includes outwardly and downwardly flared skirt 70 which directs away from ribs 66 any fluid or comminuted material flowing from the underside of flywheel 40.

Should a small amount of fluid or a portion of the lubricant work its way by resilient member 62 it is prevented from falling onto the combination radial and thrust bearing arrangement by means of an annular deflection member 71 mounted around the shaft 39a beneath the sleeve 59 and a cooperating cup shaped deflection member 72 mounted within the recess 64 and extending upwardly and inwardly to a point under the edge of annular deflection member 71. Thus any material flowing down sleeve 59 is directed outwardly and downwardly into recess 64 which is provided with a drain outlet (not shown) for evacuating any small amount of material which may work its way into the recess.

Referring now to FIGURE 3, there is shown a modified shaft and seal wherein a modified shaft 39b is provided for connecting the motor 39 to the flywheel 40. The shaft 39b is similar to 39a except that the upper end, rather than being of a reduced diameter surrounded by a sintered metal sleeve, is formed of a sintered metal impregnated with a temperature-sensitive lubricant. In operation the unitary shaft 39b functions in the same manner as the shaft 39a and sleeve 59; that is, when the shaft 39b rotates the friction between the sintered metal portion and the ribs 66 of resilient member 62 causes the temperature of the shaft and ribs to rise until it reaches a predetermined level. At this time the lubricant contained within the shaft flows and lubricates the areas of contact between the ribs and the shaft to maintain the sealing arrangement at the predetermined optimum temperature.

FIGURE 4 is a graphic representation illustrating the improved performance of the shaft and seal arrangement of the present invention in which the surface temperature is plotted against the running time. Line 73 shows the running characteristics of a shaft and seal utilizing stainless steel which has been neither sintered nor impregnated with a temperature-sensitive lubricant. As the shaft is rotated the temperature rises to an undesirable level where it fluctuates for a short period of time after which the seal fails. Line 74 shows the running characteristics of a shaft and seal utilizing the same type of stainless steel shaft but which had been sintered and impregnated with a temperature-sensitive lubricant in accordance with the applicants' invention. As indicated by line 74 the shaft and seal arrangement using the sintered stainless steel shaft reaches an optimum operating temperature at which it continues to run indefinitely without failure. Line 75 and 76 show the results of a test using a non-porous and a porous, impregnated bronze shaft respectively. It will be seen that substantially similar results were reached.

As will be evident from the foregoing description, certain aspects of the invention are not limited to the particular details of construction of the examples illustrated, and it is contemplated that various other modifications or applications will occur to those skilled in the art. It is therefore intended that the appended claims shall cover such modifications and applications as do not depart from the true spirit and scope of the invention.

What we claim as new and desire to secure by Letters Patent of the United States is:

1. For use in a food waste disposer having a stationary shredding member and a cooperating rotatable member, a rotary seal including:
   (a) a shaft connected to the rotatable member for driving said member,
   (b) a stationary sealing member formed of resilient material and contacting said shaft with a sealing fit,
   (c) the portion of said shaft engaged by said stationary member being formed from a sintered metal impregnated with a temperature-sensitive lubricant so that at a predetermined temperature said lubricant flows to the surface of said portion of said shaft and the temperature of said stationary member is maintained at an optimum operating level.

2. A rotary seal as described in claim 1, wherein said resilient member includes a plurality of spaced apart ribs contacting said shaft with a sealing fit.

3. For use in a food waste disposer including a housing defining a comminuting chamber, a stationary shredding member mounted in the chamber and a cooperating rotatable member, a rotary seal including:
   (a) a shaft connected to the rotatable member for driving said member,
   (b) a stationary resilient member mounted in said housing and contacting said shaft with a sealing fit,
   (c) a reinforcing member mounted in said housing in contact with said resilient member to support said resilient member, said reinforcing member being spaced from said shaft,
   (d) the portion of said shaft engaged by said resilient member being formed from a sintered metal impregnated with a temperature-sensitive lubricant so that at a predetermined temperature said lubricant flows to the surface of said portion of said shaft and the temperature of said resilient member is maintained at an optimum operating level.

4. The rotary seal defined in claim 3 wherein said resilient member is bonded to said reinforcing member.

5. For use in a food waste disposer including a housing defining a comminuting chamber, a stationary shredding member mounted in the chamber and a cooperating rotatable member, a rotary seal including:
   (a) a shaft connected to the rotatable member for driving said member,
   (b) a sleeve mounted on said shaft for movement therewith,
   (c) a stationary resilient member mounted in said housing and contacting said sleeve with a sealing fit,
   (d) said sleeve being formed from a sintered metal impregnated with a temperature-sensitive lubricant so that at a predetermined temperature said lubricant flows to the surface of said sleeve and the temperature of said resilient member is maintained at an optimum operating level.

6. A rotary seal as described in claim 4, where said resilient member includes a plurality of spaced apart ribs contacting said sleeve with a sealing fit.

7. For use in a food waste disposer including a housing defining a comminuting chamber, a stationary shredding member mounted in the chamber and a cooperating rotatable member, a rotary seal including:
   (a) a shaft connected to the rotatable member for driving said member,
   (b) a sleeve mounted on said shaft for movement therewith,
   (c) a stationary resilient member mounted in said housing and contacting said sleeve with a sealing fit,
   (d) a reinforcing member mounted in said housing in contact with said resilient member to support said resilient member, said reinforcing member being spaced from said sleeve,
   (e) said sleeve being formed from a sintered metal impregnated with a temperature-sensitive lubricant so that at a predetermined temperature said lubricant flows to the surface of said sleeve and the temperature of said resilient member is maintained at an optimum operating level.

8. The rotary seal defined in claim 7 wherein said resilient member is bonded to said reinforcing member.

References Cited by the Examiner
UNITED STATES PATENTS

| 2,766,943 | 10/1956 | Lockley | 241—46 |
| 2,823,055 | 2/1958 | Booth | 287—90 |
| 3,159,354 | 12/1964 | Yartz | 241—46 |

ROBERT C. RIORDON, *Primary Examiner.*

D. KELLY, *Assistant Examiner.*